June 23, 1953     S. BRADLER     2,642,777

ROTO REFLECTOR

Filed May 5, 1950

INVENTOR.
STANLEY BRADLER,
BY

Patented June 23, 1953

2,642,777

UNITED STATES PATENT OFFICE 2,642,777

ROTO REFLECTOR

Stanley Bradler, Cleveland, Ohio

Application May 5, 1950, Serial No. 160,182

2 Claims. (Cl. 88—81)

My invention relates to new and useful improvements in signal and warning devices for use on motor vehicles.

The primary object of this invention is to provide a signal and warning device attached on the discharging end of the exhaust pipe of a motor vehicle and adapted to rotate by means of the pressure or force from such exhaust.

Another object of the invention is the provision of a device as described that is provided with mirrors attached to arms radiating from an axle and so positioned on such arms as to alternately or intermittently cast the reflection of the light from the head lamps of a vehicle approaching from the rear, so as to be a warning to the operator of such car of the proximity of the car provided with such signal before the latter car is visible to such operator.

A further object of the invention is to provide a device of the character described that is simple and inexpensive in construction and readily and quickly attached to or detached from an exhaust pipe of a motor vehicle.

The foregoing objects and others secured by the use of the device will be readily discerned from a reading of the description and a reference to the accompanying drawings, in which.

Figure 1:
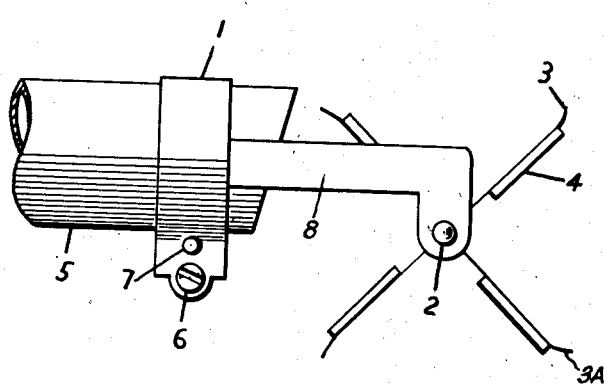
Fig. 1 shows the device attached on the discharge end of a motor vehicle exhaust pipe.
Figure 2:
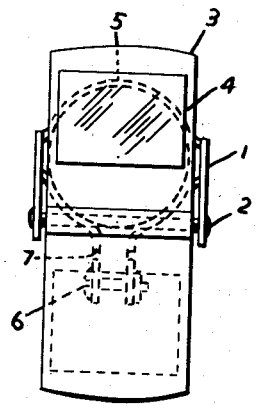
Fig. 2 is a view of the device as shown in Fig. 1 viewing it from the inner end of the segment of the exhaust pipe.

Describing the parts of the device as shown in the drawings: 5 is the outer portion of the exhaust pipe of a motor vehicle around which the collar or band 1 is attached by means of the tension bolt 6, the supporting arms 8 are removably attached to the pipe 5 by being clamped on such pipe by the collar or band 1, 2 is an axle with its ends fixed in the arms 8 and supports the radial arms which are free to rotate on 2, each of such arms has a mirror 4 attached which, with the mirrors, rotate clockwise by means of the pressure of the exhaust from the pipe 5 striking the arms in such a manner as to rotate them in the direction specified, the arms being slightly curved, or bent as shown by 3A. 7 refers to an additional aperture for a bolt if necessary.

In the use and operation of the device, the two arms 8 (drawing shows only one side of the device) are secured to the end of the exhaust pipe of a motor vehicle by means of the clamp 1 which is provided with a tension screw bolt to draw such clamp or band 1 sufficiently tight to hold the arms securely in a horizontal position so that the arms 3 will be free to rotate without striking the end of such pipe. With the device installed on a motor vehicle in the manner specified and such vehicle in travel on the highway, the mirrors as they are rotated will intermittently reflect light beams from the head lights of a motor car approaching from the rear so that the operator of such motor car will be warned of the presence of a vehicle ahead before such vehicle actually becomes visible to the operator of such rear motor car. In this respect the device is both a signal and a warning safety device.

From the foregoing description it will be readily observed that I have invented a device having new and novel features not embodied in any other similar device in use at present.

I have shown my device in a desirable form, and simple and inexpensive in structure, however, some modification may be found necessary in adapting it in use without departing from the basic features or spirit of the invention.

What I claim as new and desire to secure by Letters Patent, is:

1. A device of the character described comprising a pair of parallel spaced arms, said arms having their inner ends secured to the outer end of the exhaust pipe of a motor vehicle, said arms extending outwardly from said exhaust pipe in a horizontal position and having a horizontal rod interconnecting same, a unit removaby mounted on said rod as an axis and rotatable in a vertical plane, said unit consisting of a plurality of equally spaced radial arms each having a mirror fixed thereon adjacent the outer end portion thereof, the extreme outer end portions of the said arms being bent slightly in a direction away from said mirrors, and said unit being adapted to rotate by means of the pressure exerted on each of said radial arms by the gases discharged from said exhaust pipe.

2. A device of the character described in claim 1, said unit positioned to rotate in a clockwise direction, said mirrors positioned and adapted to reflect light rays projected on said mirrors by vehicles approaching from the rear, and said mirrors reflecting such light rays in sequence and intermittently.

STANLEY BRADLER.

References Cited in the file of this patent

UNITED STATES PATENTS

| Number | Name | Date |
|---|---|---|
| 1,600,450 | Aronson | Sept. 21, 1926 |
| 2,252,056 | Amundson | Aug. 12, 1941 |